Nov. 6, 1956    G. CHERNOWITZ    2,769,305
POWER PLANTS COMPRISING MAIN AND AUXILIARY ENGINES
Filed Jan. 6, 1949    2 Sheets-Sheet 1
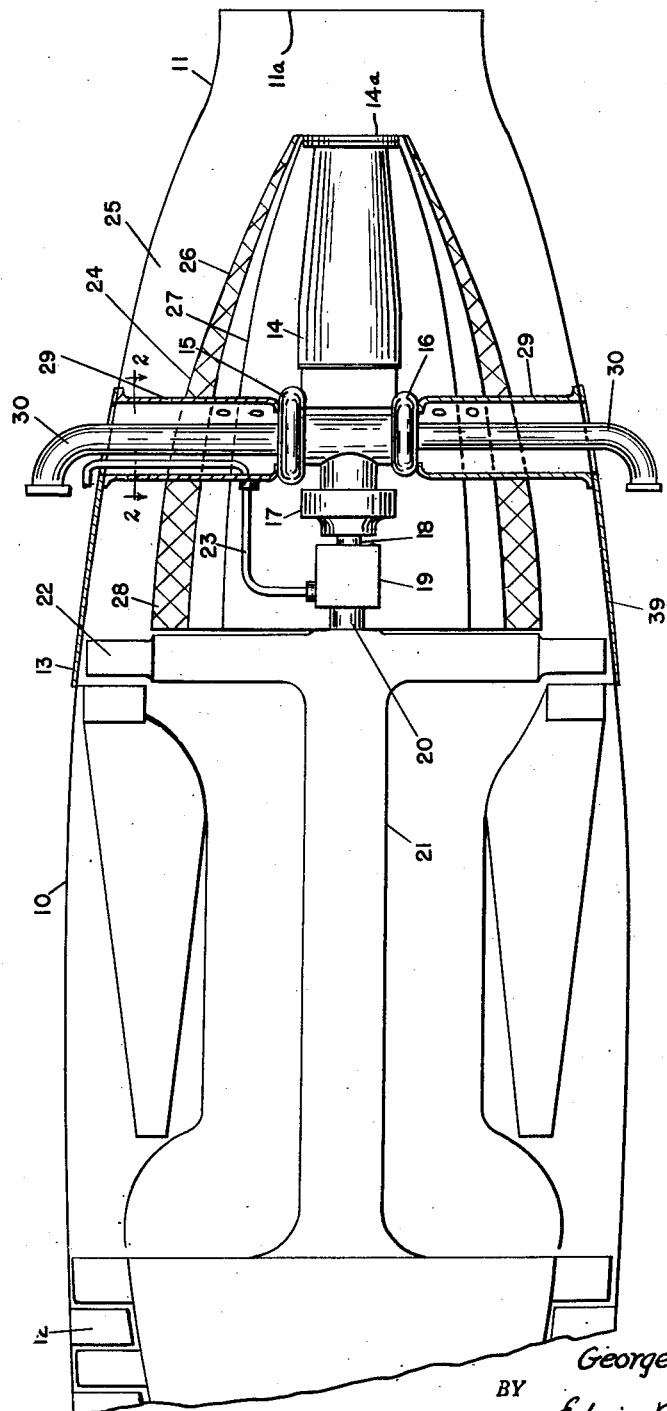
INVENTOR.
George Chernowitz
BY
Edwin B. Gary
Attorney THRUST AUGMENTATION AT CONSTANT ALTITUDE AND THROTTLE, RESULTING FROM INTERACTION OF TURBOJET AND ROCKET EXHAUSTS. AFTERBURNING EFFECTS NOT INCLUDED.

United States Patent Office 2,769,305
Patented Nov. 6, 1956

2,769,305

POWER PLANTS COMPRISING MAIN AND AUXILIARY ENGINES

George Chernowitz, Caldwell, N. J.

Application January 6, 1949, Serial No. 69,570

7 Claims. (Cl. 60—35.6)

This invention relates to a power plant having particular value in the propulsion of vehicles humanly guided or otherwise, said power plant comprising two major components designated as "main" and "auxiliary" engines which are associated in such manner that they are available for independent or conjoint use, wherein the main engine may be any form of jet, i. e.: ramjet, turbojet, etc., and the auxiliary engine is of the rocket type, the combination providing more thrust than the sum of the thrusts developed by each engine alone.

Although not necessarily limited to such use, the power plant is characterized by features which render it of particular utility in connection with aircraft, the main engine when the power plant is so employed being adapted to meet thrust requirements for normal flight conditions and the rocket engine being available to supplement and augment the main engine to provide increased thrust, for example, for assisted take-offs, increase in rate of climb, increase in ceiling, flash performance, or sustained high speeds, said supplementation being the result not only of the numerical sum of the thrusts of the two engines but also of the substantial augmentation of the thrust of the main engine itself due to interaction between the heated jet gases and the burning rocket fuel in a manner subsequently set forth. It is in fact this thrust augmentation of the jet engine proper, due to the action of the associated rocket, that is the basis of this invention.

A principal object of the invention is to provide a power plant wherein the main and auxiliary engines are associated in such a manner that the performance of the power plant when the engines are operated conjointly is higher than the sum of the performances of the engines operated individually.

A further object is to provide a power plant wherein the rocket engine is associated with the main engine in such a manner that the engines may be, so far as essential features are concerned, of conventional design and the main engine may be operated independently without interference from, or impairment of performance as a result of the presence of, the rocket engine.

A still further object is the association of the main and auxiliary engines in such a manner that a compact and light arrangement for aircraft use is provided with a minimum increase in drag and fixed weight, the arrangement so provided having the advantage that the engines may be installed and serviced with facility.

A still further object is to provide a power plant wherein the main engine may be of the jet type and wherein the rocket engine may be associated with this type of engine in such a manner that operation of the rocket engine increases the performance of the main engine.

A still further object is to provide a power plant for aircraft of the jet type wherein the available thrust is obtained with a negligible increase in the fixed weight of the aircraft and will enable greatly increased rates of climb and bursts of speed not possible with conventional jet-powered aircraft.

A still further object is to provide a power plant where- in the main engine and the rocket engine are associated in such a manner that cooling of the rocket engine and its components is facilitated.

A still further object is to provide a power plant wherein the main and auxiliary engines are associated in such a manner as to enable the use of simple and reliable controls.

A still further object is to provide a novel design and arrangement of the main and auxiliary engines, whereby to provide for simplicity and economy in design, servicing, and operation.

The invention is illustrated in the accompanying drawings wherein:

Fig. 1 is a diagrammatic sectional view of a power plant embodying main and auxiliary engines associated in accordance with the invention.

Fig. 2 is a detailed sectional view taken along line 2—2 of Fig. 1.

Figure 3:
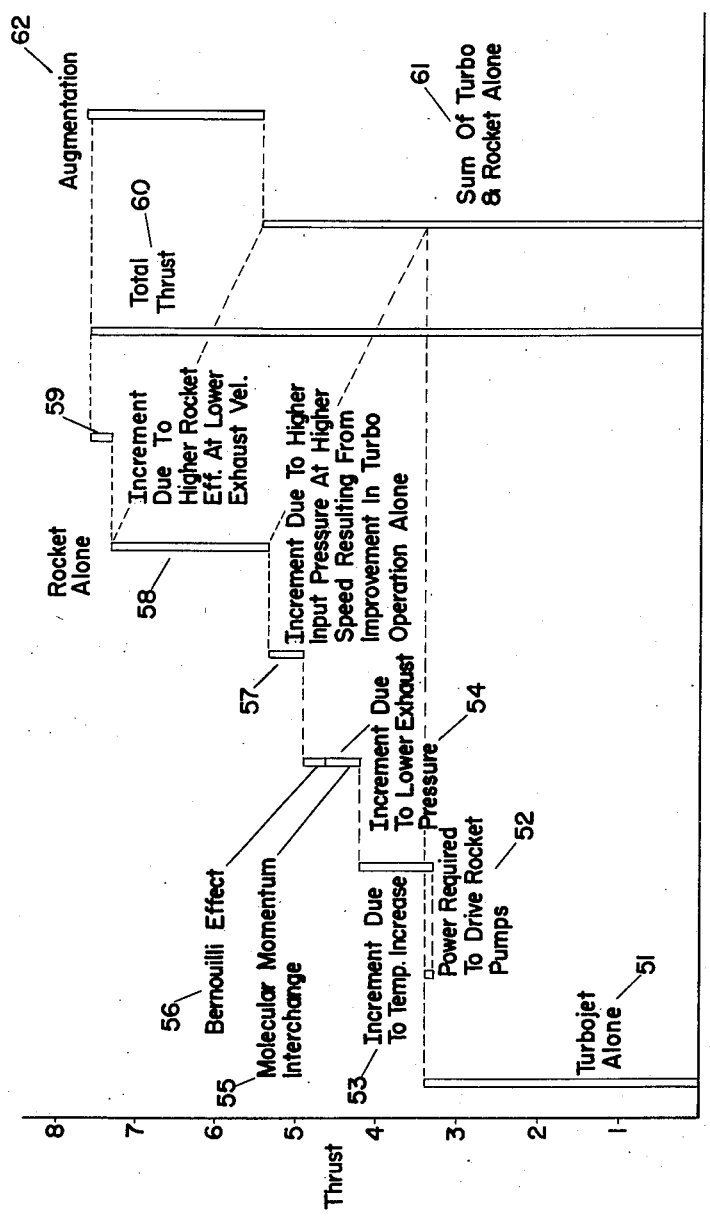
Fig. 3 is a chart illustrating thrust augmentation attained by use of my invention.

In general, the invention contemplates a power plant comprising a main engine and a rocket engine associated in such a manner that the normal requirements of the power plant are met by the main engine, while the rocket engine is available whenever higher demands for power arise.

As illustrated in Fig. 1, the power plant comprises a conventional turbojet engine 10, having a modified tail pipe 11, the compresser and turbine stages being indicated 12 and 22, respectively. A rocket engine is indicated at 14. The latter, as illustrated, is of the liquid propellant type, having propellant pumps 15 and 16, which are connected by suitable gearing 17, coupling 18, clutch 19, and coupling 20, to the main shaft 21 which carries the turbojet turbine wheel 22. A control line 23 leads to the clutch 19.

The rocket engine 14 is housed within an inner cone 24, which is located coaxially with the turbojet tail pipe 11 and which is spaced from the walls thereof to define an annular passage 25 for the combustion gases from the turbojet engine, the cone 24 tapering toward the end of the rocket engine 14 and terminating therewith short of the end of the tail pipe 11.

The distance between the rocket combustion chamber exit 14a and the exit 11a of the tail pipe defines a mixing zone for the combustion gases from the two engines.

The cone 24 serves to insulate the rocket engine and associated components from the combustion gases from the turbojet engine and may, as illustrated, include an outer wall 26, an inner wall 27, and suitable insulating material 28. If preferred, however, suitable cooling fluids or gases may be circulated in the space between the walls 26 and 27.

The thrust of the rocket engine 14 is transmitted to the main structure of the turbojet 10 through supports 29. The latter, as illustrated, are in the form of hollow housings and, as such, have the advantage that they may provide passages for propellant pipes 30 which lead to the pumps 15 and 16 of the rocket engine coolant pipes, etc. and the control line 23 which leads to the clutch 19. The rocket engine may, and preferably does, utilize the same fuel provided for the main engine with a suitable oxidizer. The supports 29 are available for mounting the rocket engine components and auxiliary equipment and may be filled with suitable material, including fluids or gases, to insulate the propellant lines 30, control line 23, and any other enclosed components from the turbojet combustion heat.

The association of the rocket and turbojet engines in the manner illustrated provides a power plant having a higher performance characteristic than the sum of the two engines considered separately due to rocket action on the turbojet's operating cycle; the reasons follow. Basically the reaction thrust developed by a turbojet, or any kind of jet engine for that matter, is related directly to the product of the mass and the velocity of the exhaust gases, which in turn are related to the difference in pressure between inlet and exhaust as well as to the temperature ratio. Anything, then, which will cause a higher exhaust temperature or a lower exhaust pressure will increase the thrust, which will in turn increase aircraft speed resulting in higher inlet or ram pressure and thus more thrust until equilibrium is reached. In this connection it will be noted that the exhaust gases from the rocket engine exercise an ejector action with respect to the exhaust gases from the turbojet engine through increased velocity as a result of molecular momentum interchange and also as a result of boundary action in accordance with Bernouilli's theorem thereby reducing the back pressure at the turbine stage with resulting increased flow of the exhaust gases from the turbojet engine. The increased flow and heat exchange of the respective turbojet gases and the rocket gases in the tailpipe 11 of the turbojet, as a result of the location of the rocket engine in the manner illustrated, increases substantially the normal turbojet thrust output. The rocket gases, due to the nature of the fuel used, have a high specific heat, so that small amounts of rocket exhaust at temperatures normal to rocket engine operation will raise to the desired level the temperature of relatively large amounts of turbo exhaust gases.

The performance of the turbojet engine may be further increased by utilizing the rocket exhaust flame to effect afterburning of the turbojet exhaust gases by operating the rocket combustion at a mixture ratio such as to provide excess fuel in the rocket exhaust for combustion with the excess air in the turbojet gases. The rocket engine, which acts as a flame holder, and the turbulence of the mixing gases, renders unnecessary structural flameholders such as are normally employed. Fig. 3 is a chart illustrating the augmentation of a turbojet as a result of interaction between turbo and rocket engines. For simplicity, the afterburner effects are omitted from the presentation. In the chart are the various elements of thrust which go to make up the resultant achieved, a resultant of considerably larger value than the simple sum of the individual rocket and jet thrusts.

It will be apparent that the additional thrust resulting from the association of the rocket engine with the turbojet engine in the manner described will increase the speed of the aircraft and this, in turn, will result in an increase in the ram pressure of the air entering the turbojet engine, thereby further increasing the performance of the turbojet, particularly at high altitudes and at high speeds. As a result of the large increments of thrust obtained by utilizing the rocket engine and as a result of the greatly increased performance of the turbojet engine resulting from the simultaneous use of the rocket engine, much shorter take-off distances and times for a given gross weight or take-offs with greater gross weights are possible. The weight of the rocket engine compared with the fixed weight of the aircraft is negligible and the association of the rocket engine with the turbojet engine in the manner contemplated does not impair the operation of the turbojet engine when employed alone.

The turbojet engine is required to furnish only enough power to operate the rocket propellant pumps at the proper speed to permit operation of the rocket engine. Hence, flights at altitudes greatly in excess of that possible with normal turbojet engines is feasible.

The power plant described has the further advantage that engines of conventional design may be employed without necessity of substantial modification. It will also be noted that the rocket engine is protected from the exhaust gases from the turbojet engine, does not obstruct the normal exhaust gas flow from the turbojet engine, can be controlled in a simple manner, and does not add materially to overall drag.

Referring to the chart shown in Fig. 3, which is calculated to relative thrust values indicated by reference numbers 1–8 inclusive, the first measure indicated is the relative thrust of the turbojet 51 alone. There is then a loss of power at 52 required to drive the rocket pumps. At 53 there is noted the increment due to temperature increase of the turbojet exhaust due to heating action by the rocket. There is next indicated the increment 54 due to lower exhaust pressure which is comprised of two parts, one 55 being due to an increase in velocity caused by molecular momentum interchange between the turbojet and rocket exhaust gases, and the second 56 being due to a drop in pressure, which is the Bernouilli effect, resulting from the difference in velocity of the two gases. At 57 there is noted the increment due to higher ram pressure at the higher aircraft speed, resulting from the previously noted gains, and, at 58 the increment due to magnitude of the rocket thrust alone, which is enhanced at 59 by an amount resulting from an increase in rocket efficiency due to the slowing down of the rocket exhaust. At 60 there is noted the total thrust obtained pursuant to the invention, and, at 61 the aggregate of the thrust of the turbo alone and the rocket alone, which indicates a difference, illustrated at 62, of augmentation attributable to the invention. A rocket, at relatively low speeds, that is, in the region of the low supersonic speeds or below, is quite inefficient. As is well known, its efficiency is zero at zero forward speed. It is well known that a rocket's efficiency is inversely proportional to the velocity of the escaping gases within certain limits. For this reason, any process which will decrease the velocity of the rocket's gases, within certain limits, increases its efficiency. This increase is shown in Fig. 3 as augmentation of the rocket thrust due to the slowing down action of the slower moving jet exhaust.

The rocket engine may be mounted in any preferred position which will permit the proper connections to be made between the turbojet drive shaft and the pump drive of the rocket engine. Likewise, the rocket engine may be mounted in various ways and is not limited to any specific location or attitude.

I claim as my invention:

1. A power plant comprising a jet engine having an exhaust exit, and a rocket engine mounted within the jet engine and short of said exhaust exit, and constructed and arranged within the jet engine so as to provide between the rocket engine and the exhaust exit of the jet engine a mixing zone for the exhaust gases of both engines whereby the exhaust gases of the rocket engine will discharge into the exhaust gases of the jet engine to exercise an ejector action on the exhaust gases of the jet engine.

2. A power plant comprising a jet engine having an exhaust exit and a rocket motor mounted within said jet engine and short of the exhaust exit, said rocket motor being so constructed and arranged relative to the jet engine exhaust exit so as to provide a mixing zone for the exhaust gases of both engines, and means for operating the rocket engine at a mixture ratio such as to provide excess unburned fuel, for afterburning the unburned gases in the exhaust gases in the exhaust from the jet engine, said mixing zone effecting velocity interchange, accelerating the exhaust gases from the turbojet engine, reducing the back pressure of the turbine stage with resulting increase flow of exhaust from the turbojet engine, substantially increasing the normal turbojet thrust output.

3. A power plant comprising a main engine structure including a gas-driven main engine for transmitting thrust to the structure required for normal operational purposes, an exhaust gas housing connected to said engine and having a gas exit opening, a gas-driven rocket engine having a combustion chamber exit end directed toward and inwardly of said gas exit opening, said rocket engine being so constructed and arranged relative to the combustion chamber exit as to define therewith a mixing zone within the tailpipe for the gases discharged from the main and rocket engines, and means connecting said rocket engine to said housing to transmit the thrust of the rocket engine to the main, gas-driven engine to augment the thrust of the latter and provide a resultant thrust of larger value than the simple sum of the individual main engine and rocekt engine thrusts.

4. In a power plant as set forth in claim 3, said rocket engine being positioned in said housing coaxially.

5. In a power plant as set forth in claim 3, the rocket engine being provided with a fuel and oxidizer combination whose combustion products are of a higher specific heat than that of the main engine so that small amounts of exhausts from said rocket will raise the temperature of relatively large amounts of exhausts from the main engine.

6. In a power plant as set forth in claim 3, a cone positioned in said housing around the rocket engine combustion chamber exit coaxially with the housing and spaced from the walls of said housing to define an annular passage for the combustion gases from the main engine, said cone tapering toward and terminating short of the discharge exit end of the rocket engine.

7. A power plant comprising a jet engine, said engine being provided with a housing having a discharge end, and a rocket engine provided with a combustion discharge end disposed medially of and spaced from the housing discharge end constructed and arranged to define therewith a mixing zone short of the housing discharge end for the combustion gases of the jet and rocket engines, whereby, when said engines are operating simultaneously, the exhaust gases from the rocket engine act upon the exhaust gases from the jet engine to increase the power output of the latter.

References Cited in the file of this patent

UNITED STATES PATENTS

| | | |
|---|---|---|
| 1,103,503 | Goddard | July 14, 1914 |
| 2,074,098 | Adams | Mar. 16, 1937 |
| 2,398,125 | Summerfield et al. | Apr. 9, 1946 |
| 2,419,866 | Wilson | Apr. 29, 1947 |
| 2,427,846 | Forsyth | Sept. 23, 1947 |
| 2,447,696 | Forsyth | Aug. 24, 1948 |
| 2,501,633 | Price | Mar. 21, 1950 |
| 2,531,761 | Zucrow | Nov. 28, 1950 |
| 2,555,080 | Goddard | May 29, 1951 |
| 2,610,464 | Knoll | Sept. 16, 1952 |

FOREIGN PATENTS

| | | |
|---|---|---|
| 573,399 | Great Britain | Nov. 20, 1945 |
| 919,275 | France | Nov. 18, 1946 |